G. E. HOWE.
NUT LOCK.
APPLICATION FILED FEB. 3, 1914.

1,140,594.  Patented May 25, 1915.

Inventor
G. E. Howe.

Witnesses

By , Attorneys.

UNITED STATES PATENT OFFICE.

GEORGE E. HOWE, OF EAST SMETHPORT, PENNSYLVANIA.

NUT-LOCK.

1,140,594.  Specification of Letters Patent.  Patented May 25, 1915.

Application filed February 3, 1914. Serial No. 816,213.

*To all whom it may concern:*

Be it known that I, GEORGE E. HOWE, citizen of the United States, residing at East Smethport, in the county of McKean and State of Pennsylvania, have invented certain new and useful Improvements in Nut-Locks, of which the following is a specification.

The present invention relates broadly to new and useful improvements in nut locks, and has particular reference to that type of such devices which consists essentially in a nut and a sleeve which is carried thereby and is adapted, upon being threaded in the proper direction, to compress the extension carried by the nut into engagement with the bolt, whereby the nut is locked against rotation thereon.

The principal object of the present invention is to provide a nut lock of the type specified, which consists of a minimum number of parts so designed that they may be cheaply manufactured, will be durable and efficient in their construction and may be readily applied to any bolt.

A further object is to provide a nut having an externally threaded extension from which projects a number of resilient gripping jaws adapted to be forced into engagement with the shank of the bolt upon the threading of a locking sleeve outwardly on the extension.

The above and additional objects are accomplished by such means as are illustrated in the accompanying drawings, described in the following specification and then more particularly pointed out in the claims which are appended hereto and form a part of this application.

Figure 1:
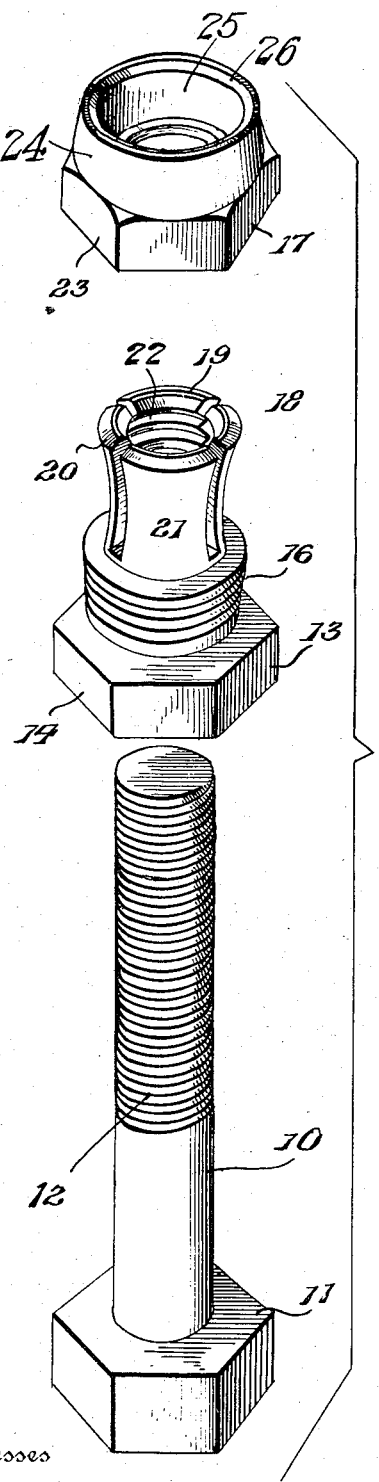
Figure 2:
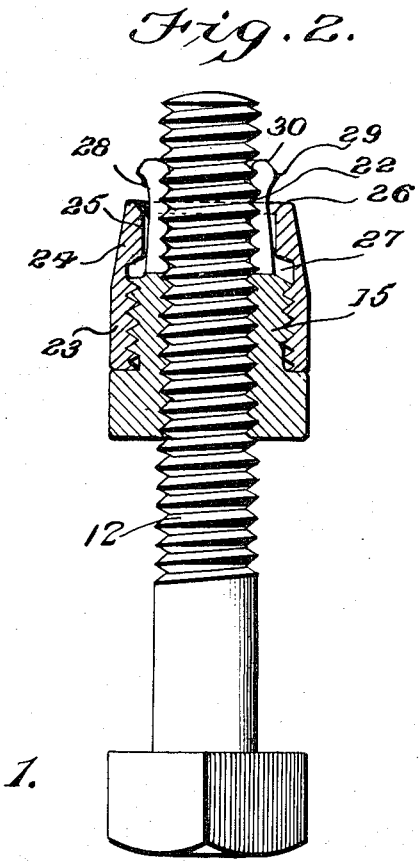
Figure 3:
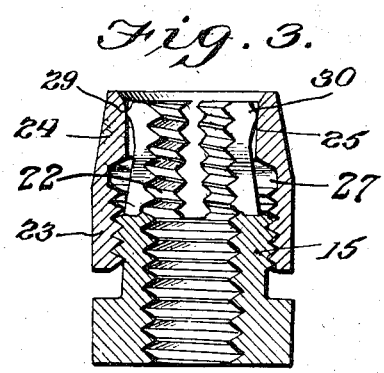

With reference to the drawings, wherein there has been illustrated the preferred embodiment of this invention as it is reduced to practice, and throughout the several views of which similar reference numerals designate corresponding parts: Figure 1 is a detail perspective view showing the bolt, nut and locking sleeve of the present invention in disassembled relation but indicating the manner in which the elements are adapted to be assembled when in operative position on the bolt. Fig. 2 is a longitudinal section through the nut lock showing the sleeve in inoperative position. Fig. 3 is a longitudinal section through the nut showing the sleeve in locking engagement with the resilient gripping jaws carried by the extension of the nut.

Proceeding now to the description of the drawings, and referring particularly to Fig. 1, in which the present invention is best illustrated, as regards the details of the device, the numeral 10 designates the bolt which is of the usual design and includes a head 11 and a threaded shank 12. The nut designated as an entirety by the numeral 13, consists in a body portion 14 of conventional design which may be hexagonal or of any other formation.

Extending from one face of the nut is a cylindrical extension 15, which is threaded internally and forms, in reality, a continuation of the internal thread of the nut, so that the sleeve and nut are directly adapted to be threaded on to the shank of the bolt as a unit. The extension 15 is also externally screw threaded as indicated at 16, the purpose of thus externally threading the nut being to permit the application of a locking sleeve, designated at 17.

Extending longitudinally from the extension 15 are four quadrantly spaced gripping jaws 18, 19, 20 and 21. The body of the nut 14, the extension 15 and the gripping jaws are preferably cast as a unit and are, therefore, made of tempered steel in order that the gripping jaws may be possessed of the requisite resiliency. A helical thread 22 is cut in the inner faces of the gripping jaws and corresponds in pitch to the thread of the bolt shank to which the nut is applied. These gripping jaws are adapted to be compressed to engage their thread 22 with the thread of the bolt upon the manipulation of the locking sleeve 17. This locking sleeve 17 includes a body portion 23 which is of nut form and which may be hexagonal or of any other design. Extending longitudinally from the body portion 23 of the locking sleeve is an annular flange 24 which is smooth on its inner face, as at 25, and is of uniform diameter. The inner edge of the outer terminal of the member 24 is beveled, as at 26, in order to particularly adapt the member 24 for compressing the gripping jaws, as will be hereinafter more fully explained. An annular recess 27 is formed in the inner wall of the member 24 at its junction with the body member 23 of the locking sleeve. By forming this recess the wall of the extension 24 is, of course, materially reduced in thickness and a certain amount of flexibility is thus imparted to the extension.

It is now to be noted that the jaws are concaved on their outer faces, as at 28, so that the inner wall of the member 24 may be disposed within the limits of the terminal of the sleeve, as in Fig. 2. By thus concaving the outer faces of the jaws, it will be apparent that the threading of the sleeve 23 outwardly on the extension 15 of the nut will act to bring the inner wall 25 of the member 24 into engagement with the curved face of the jaws, so that the jaws will be compressed and the thread 22 will be engaged in the thread of the bolt shank. It will also be seen that by concaving the outer faces of the jaws, there is produced at the outer terminal of each jaw, a bead indicated at 29. This bead extending outwardly, as it does, beyond the inner face 25 of the member 24, it acts as a stop for holding the locking sleeve against accidental displacement from the extension.

It will be seen, upon reference to Fig. 3, that the sleeve may be positioned on the extension of the nut only when the shank of the bolt has been removed. In this connection, it may be well to explain that the gripping jaws being formed of resilient metal, they may, of course, be inwardly compressed to a sufficient distance to permit the application of the sleeve to the extension of the nut. In order to aid in the application of the sleeve to the nut, the outer edge of the outer terminal of the jaws are beveled as at 30.

In concluding the description of my invention, I desire to call particular attention to the fact that the device consists in a minimum number of parts which are comparatively simple in their construction but are so designed and related that they form an efficient means for locking the nut against rotation on the bolt. Attention is also directed to the fact that my nut lock may be employed with any standard form of bolt, since it does not require an especially constructed bolt shank and can be manufactured in various sizes so that the threaded bore extending through the nut 13, the extension 15 and locking sleeve 17, will conform to bolts of standard sizes.

In reduction to practice, it has been found that the form of this invention, illustrated in the drawings and referred to in the above description as the preferred embodiment, is the most efficient and practical; yet realizing that the conditions concurrent with the adoption of this device will necessarily vary, it is desired to emphasize the fact that various minor changes in details of construction, proportion and arrangement of parts may be resorted to, when required, without sacrificing any of the advantages of this invention, as defined in the appended claims.

Having thus described the invention, what is claimed as new is:

1. A nut lock including a nut, an extension formed thereon, resilient gripping jaws formed on the extension, a locking sleeve threaded on the extension, and an unthreaded extension formed on the locking sleeve, said extension being adapted to engage the jaws when the sleeve is threaded outwardly on the extension and to compress the jaws into locking engagement with a bolt shank, and outwardly extending beads formed on the outer terminals of the jaws for normally holding the sleeve against removal from the extension.

2. A nut lock including a nut, an extension formed thereon, a plurality of resilient gripping jaws extending longitudinally from the extension, said gripping jaws, extension, and nut being internally threaded to receive a bolt shank, a sleeve threaded on the extension, said sleeve having a convexed portion adapted to engage the outer faces of the jaws for compressing the jaws into locking engagement with a bolt shank.

3. A nut lock including a nut, an extension formed thereon, resilient gripping jaws extending longitudinally from the extension, said jaws, extension and nut being internally screw threaded to receive a bolt shank, said extension being also externally threaded, an internally threaded sleeve mounted on the extension, an unthreaded flange carried by the sleeve, said flange being disposed to encircle the jaws, the outer faces of the jaws being concave whereby the sleeve may be rotated on the extension to move the flange into engagement with the outer faces of the jaws for compressing the jaws into locking engagement with a bolt shank.

4. A nut lock including a nut, an extension formed thereon, said extension being internally and externally threaded, resilient gripping jaws formed on the extension, the outer faces of said gripping jaws being concaved adjacent their outer terminals, an arcuate bead formed at the outer terminal of each jaw, said beads being concaved at their lower edge portions to merge into the concave portions of the jaws, and a sleeve having threaded engagement at its inner terminal with the extension, the outer terminal portion of the sleeve being smooth on its inner face and being of an internal diameter less than the normal diameter of the jaws at the bead portions thereof, whereby the sleeve, when threaded outwardly on the extension will be engaged at its outer terminal portion with the concave portions of the jaws and will force the free terminals of the jaws into locking engagement with a bolt shank.

5. A nut lock including a nut, an extension formed thereon, a plurality of resilient gripping jaws having their outer faces concaved, said nut, extensions and jaws being internally threaded to receive a bolt shank, and a sleeve threaded upon the extension, the inner face of the sleeve being convexed to correspond with the concavity of the jaws whereby the sleeve upon being threaded into engagement with the jaws will compress the same into locking engagement with the bolt shank.

In testimony whereof I affix my signature in presence of two witnesses.

GEORGE E. HOWE. [L. S.]

Witnesses:
   STERLING R. LINDSLEY,
   JOHN P. DEVLIN.